June 29, 1954 R. C. CARLSON 2,682,411

PHONOGRAPH RECORD PLAYER

Filed March 22, 1949 4 Sheets-Sheet 1

INVENTOR.
Reuben C. Carlson
BY
J. D. Douglas
Att'y.

INVENTOR.
Reuben C. Carlson
BY
J. D. Douglas
Atty.

INVENTOR.
Reuben C. Carlson
BY
J. W. Douglas
Att'y.

PHONOGRAPH RECORD PLAYER

Filed March 22, 1949 4 Sheets-Sheet 4

INVENTOR.
Reuben C. Carlson
BY
J. W. Douglas
Att'y

Patented June 29, 1954 2,682,411

UNITED STATES PATENT OFFICE 2,682,411

PHONOGRAPH RECORD PLAYER

Reuben C. Carlson, Chicago, Ill., assignor to Admiral Corporation, Chicago, Ill., a corporation of Delaware Application March 22, 1949, Serial No. 82,721

7 Claims. (Cl. 274—10)

This invention relates to automatic phonograph record player mechanism, and in particular to novel features thereof, which include provision for magazine accommodation for records differing in diameter besides novel mechanism for reproducing the records.

The invention comprehends novel mechanism in combination with a record player of the class which includes a turntable, above the level of which records are adapted to be supported by magazine means provided by an element to provide support for the records at their center holes and, concurrently, mechanism to provide support for the records at their peripheral edges. The novel mechanism is adapted to provide for adjustable movement of the record support element with respect to the record support mechanism to enable the magazine means to support similar sized records in stacks, the stacks differing according to diameter, and each record adapted to be released to the turntable by simplified mechanism. Concurrently with movement of the record support member of the magazine means, the turntable is also adapted to be adjusted so that the beginning of the sound groove of a record of any one of a plurality of sizes, supported by the turntable, may be carried to a predetermined point where it is engaged by a pickup arm controlled by simplified mechanism.

In record players of the foregoing description, it is customary to so construct the ejector mechanism that it compensates for the difference in size of disc records. This has usually been effected by mounting the record support element of the ejector mechanism in such a way that it can be rotated about a vertical axis or else slid backward and forward at the same time, carrying with it a push plate or other means for dislodging the bottommost member of a stack of records from the support provided by the ejector head and spindle. At any rate, whatever the magazine means that was adopted to accommodate the different sizes of records, a great many machine parts were of necessity employed.

Since, in machines of prior construction, the spindle was in fixed relationship to the ejector head and the beginning of the sound groove of different sized records, consequently at different distances from the spindle, it was necessary to provide mechanism by which the pickup arm could be swung automatically to either of at least two different positions above the beginning of said sound grooves before being rocked into engagement therewith. Usually, the mechanism to provide for this was in turn either regulated manually from the ejector head or automatically from a record as it was positioned on the turntable. In either case, the mechanism employed added considerably to the intricacies of the record player.

Due to the present invention, the ejector mechanism is greatly simplified, since the spindle is fixed to a mobile support and consequently adapted to be moved to and from the ejector mechanism, thereby enabling an ejector mechanism of more simplified construction to be used. Since the turntable of my novel record player is also movable with the spindle, the beginning of the sound groove of any one of a plurality of sized records is adapted to be carried concurrently to a predetermined point with respect to the vertical axis of the pickup arm. The pickup arm is, in turn, adapted to be swung to but one predetermined position over the beginning of the sound groove of any of the foregoing records by mechanism, also of a more simple structure than was previously used.

Other advantages of the invention will be set forth in part hereinafter and in part will be obvious herefrom, or may be learned by practise with the invention, the same being realized and attained by means of the instrumentalities and combinations pointed out in the appended claims.

Figures 1, 2:
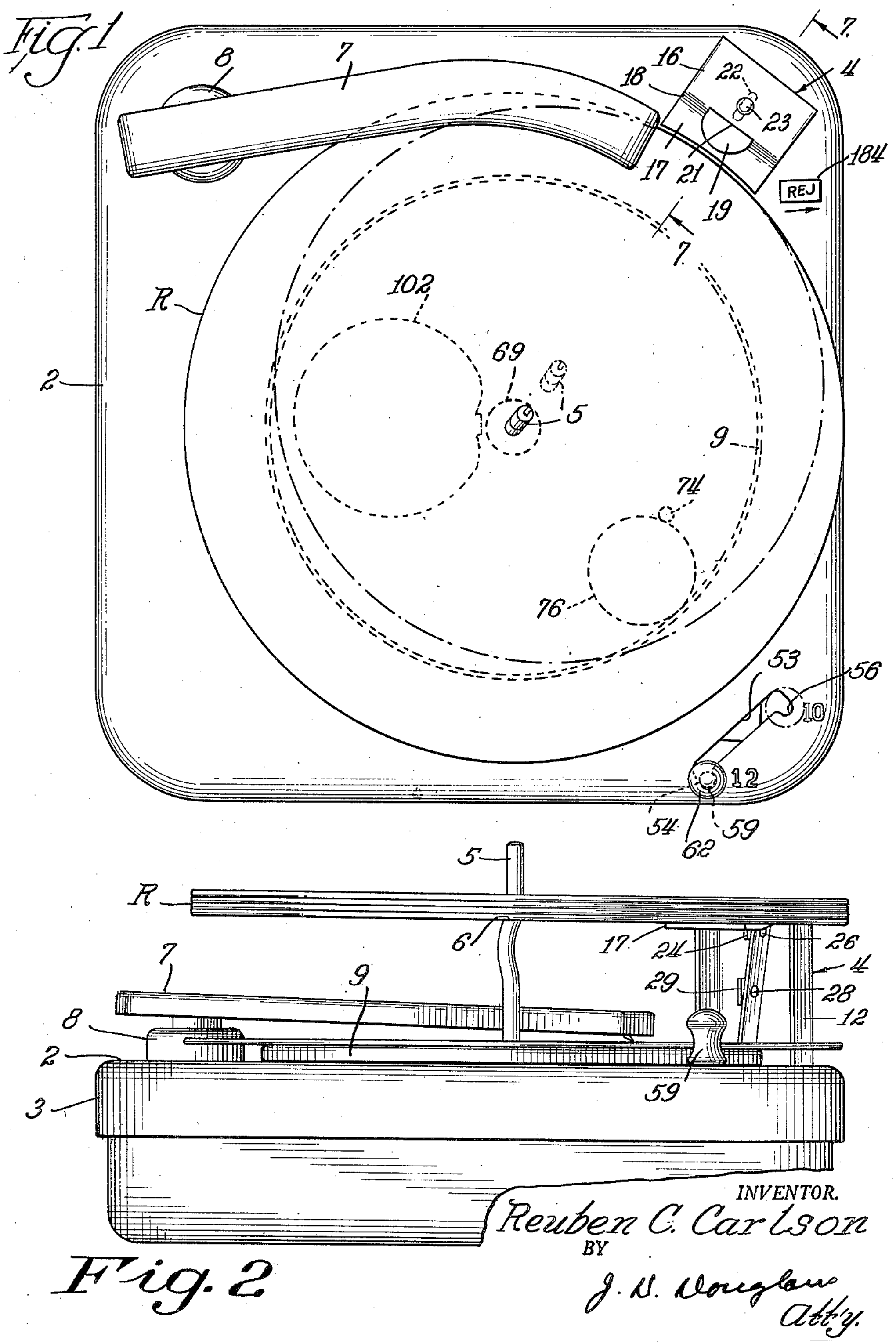
Fig. 1 is a top plan view of a record player in which the invention is incorporated.
Fig. 2 is a front elevation thereof.

In the drawings, wherein for the purpose of illustration, is shown one embodiment of my improved record player, the reference character 2 is used to denote a base plate or frame, preferably of sheet metal, having a flange 3 extending downwardly from its edge to increase its rigidity. Above the base plate 2, a group or stack R of records is supported by magazine means provided by an ejector head 4, to provide support for the records at their peripheral edges, and a spindle 5 to provide support for the records at their center holes. The records rest on a shoulder 6 of the spindle, itself supported by means to be described hereinafter. A pickup arm 7 is supported from base plate 2 by means including a bearing member 8 so that the pickup arm may be swung with respect to a turntable 9 which is rotatable about the spindle 6.

Figure 7:
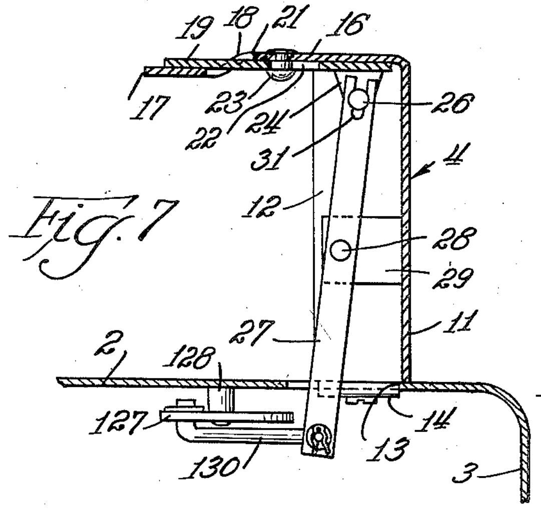
Fig. 7 is a vertical section of the ejector head taken substantially on line 7—7 of Fig. 1.

As previously stated, the ejector head 4 provides support for a group of records R. To understand the structure of the ejector head, reference should be made to Fig. 7 wherein the head 4 comprises a stationary vertical wall 11, preferably of sheet metal, from opposite vertical edges of which are bent flanges 12 to add rigidity to the wall. The ejector head 4 is positioned over an aperture 13 in the base plate 2 through which the flanges 12 extend and below which the flanges terminate in feet 14, extending away from each other, which are bolted to the base plate 2. Upwardly, the wall is bent transversely thereof to provide a horizontal wall 16 which terminates in a ledge 17 on which the records R rest. The ledge 17 is at a lower horizontal level than the wall 16 due to an offset 18 between the ledge and horizontal wall. The offset is just sufficient for a push plate 19, in extension through an aperture 21 in the offset, to be associated intimately with the upper side of the ledge and the lower side of wall 16. The push plate is provided with a slot 22, centrally thereof, through which a headed pin 23 extends downwardly from the wall 16 to secure the push plate slidably to the wall 16. The push plate 19 is of such a length that when in an extended position it reaches at least as far as the edge of the ledge 17. In its other, retracted or normal position the push plate is sufficiently removed from the free edge of the ledge 17, by means later to be described, to afford space thereon and adjacent the end thereof for the bottommost record of the stack of records R to rest. The push plate 19 also includes an ear 24, struck downwardly therefrom, and which, in turn, carries a pin 26 extending laterally thereof. Below the wall 16 a lever 27 is pivoted at 28 to a bracket 29 rigidly carried by the wall 11. Upwardly thereof, the lever 27 is bifurcated by a slot 31 in which is received the pin 26 so that when the lever is rocked about its pivot the push plate is reciprocated to dislodge the bottommost record of the stack from the support of the ledge 17 and shoulder 6 of the spindle.

As will be now understood, no provision has been made for exending the record supporting surface 17 and push plate 19 to provide for records of more than one size as in record players of common construction. Therefore, to compensate for the difference in size between records such as those of 10-inch and 12-inch diameters, I provide means by which the spindle 5 may be moved laterally toward and away from the ejector head 4. Mechanism by which this is carried into effect includes a mobile member, carrier member or plate 37. It is associated with the base member 2 adjacent an elongated opening 38 in said base member. The carrier member 37 is also of elongated formation and of greater length than the opening 38 so that the member 37 is adapted to swing about an axis at one end thereof, indicated by the character A, provided by mechanism to be described hereinafter. Additional means to associate the plate 37 movably with the base 2 includes an arm 39 which extends from one side of the plate under the base 2 while on the opposite side thereof the plate 37 includes an arm 41, extending over the surface of base plate 2, the arm 41 being offset at 42 to provide for this. Additionally, each of the arms 39 and 41 includes a slot 43 which is arcuate of the axis A. Headed pins 44, carried by the base plate 2, extend through the slots 43 to anchor the carrier member 37 slidably to the base plate. If desired, washers 46 on the ends of pins 44 outwardly of the arms 39 and 41, also provide surfaces against which said arms have bearing relationship.

Latch means are also provided to lock the carrier member 37 in whichever of two predetermined positions in which it may be positioned in the embodiment illustrated, although I also contemplate more than two positions to which the mobile member may be moved, to conform with records of unusual sizes, i. e., records other than 10-inch or 12-inch sizes, as, for instance, those 7 inches in diameter. To accommodate records of the various sizes, a slot 53 is provided in the base 2 above the swingable end of plate 37, i. e., the end opposite the axis A. The slot 53 is arcuate of axis A and includes, for the embodiment adapted to play only two sizes of records, a notch 54 and a notch 56 (Figs. 1 and 3) at either end of the slot. The plate 37 carries a latch lever 57 which is pivoted to said plate at 58 which is at a point preferably eccentric to the longitudinal axis of the plate 37 and at the end thereof. The latch lever 57 carries, toward one end thereof, a latch pin 59 which extends upwardly through the slot 53. The latch lever 57 is biased about its pivot 58 to urge pin 59 toward the outer edge of the slot 53 by a tension spring 61 so that said pin releasably engages notch 54 laterally of one end of slot 53, or the notch 56 laterally of the opposite end of the slot. In Fig. 1 the spaced relationship of the spindle 5 to the ejector mechanism 4 is such as to provide operative magazine support for 12-inch records. This relationship is maintained by engagement of the pin 59 with notch 54. When it is desired to change the spacing of the spindle and ejector mechanism for support of a 10-inch record, a handle 62, surmounting that portion of the pin in extension, above the base 2, is grasped and the lever 57 turned against the resistance of spring 61 moving the pin 59 out of engagement with notch 54. The plate 37 is then swung about its axis A until pin 59 is opposite notch 56 into which it is moved.

Figure 8:
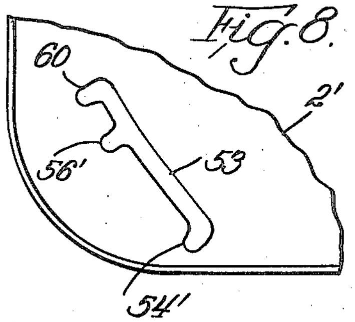
Fig. 8 is a fragmentary bottom plan view of a second embodiment of the locking device shown in Fig. 3.

Although, as illustrated, the pin 59 is adapted to engage but two notches, namely, the notches 54 and 56, thereby providing magazine support means for 10-inch and 12-inch records, it will be understood how the slot 53 could be elongated, as in the alternative embodiment of Fig. 8, for a third notch 60, spaced from notches 54′ and 56′, to receive the pin 59 and thereby maintain the plate 37 in such a position that the spindle and ejector mechanism 4 would provide operative support for some other sized record such as one of 7-inch diameter.

As has been previously indicated, the turntable 9 is carried by the carrier member 37. This is effected by means which also provides for support of the spindle 5. Briefly, it involves an aperture 63 in the plate 37. From a bracket 64, rigidly attached to plate 37, a sleeve 66 extends upwardly to receive therein the spindle 5 while, at the base thereof, said spindle is provided with opposed flat surfaces 67 adapted to register with corresponding flat surfaces on a base member 68 through which the spindle extends, the base member being rigidly fixed to the bracket 64. The turntable includes a hub 69 which is journaled on the sleeve 66 and spaced from the bracket 64 by a conventional ball thrust bearing 70 sandwiched between washers 71 of some vibration insulating material such as cork.

Provision for constantly driving the turntable 9 includes a motive unit 72, supported from the carrier member 37, but which will not be described in detail since it forms the subject matter of a copending application filed on November 26, 1945, in the name of George Redfied, Ser. No. 630,709, now U. S. Pat. No. 2,479,512. It may, however, be timely to state that the motive unit comprises a motor 73 having a pulley 74 and a rubber tired idler wheel 76 adapted to be swung around the pulley, with which it is in constant, frictional driving communication and also to be biased into driving communication with the turntable by suitable means. The motive unit also includes a plurality of arms 77 by which it is supported from the plate 37 below an aperture 78 therein. Rubber bushings between the arms 77 and member 37 further segregate vibration, created by the motor, from other parts of the machine.

Figure 5:
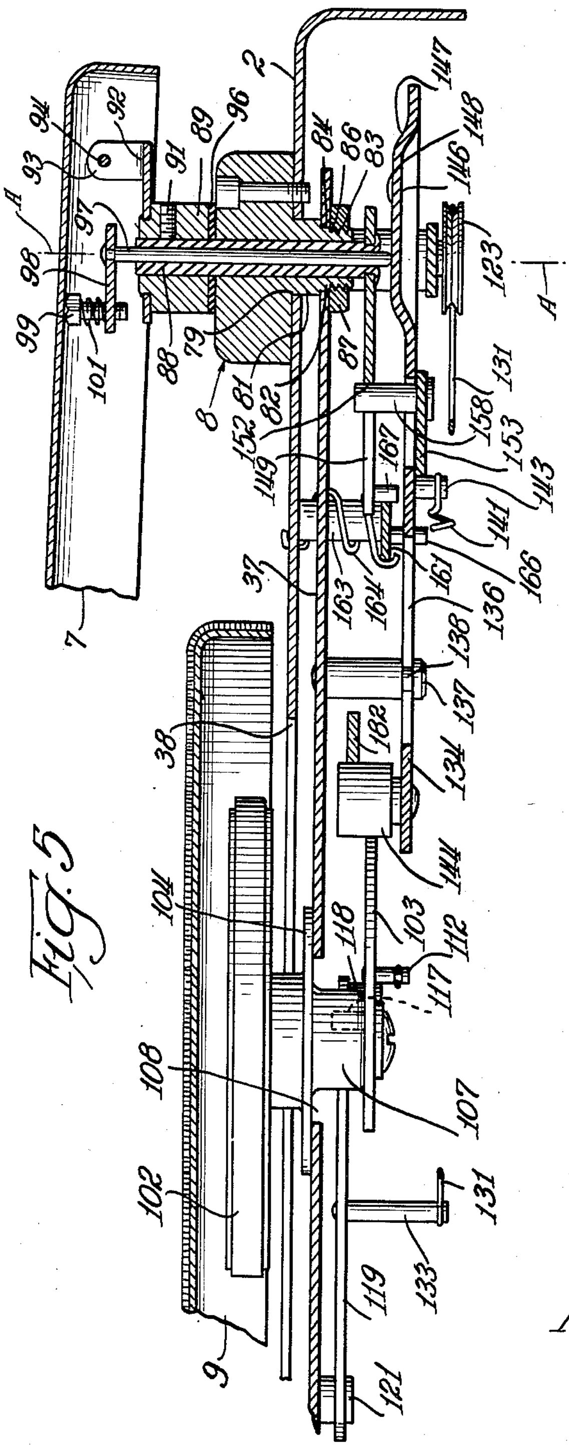
Fig. 5 is a vertical section taken substantially on line 5—5 of Fig. 4.

As has been previously indicated, the bearing 8 provides support for the carrier member 37. To provide for this, the bearing 8 is bolted to the base plate 2 at an aperture 79 therein (Fig. 5) through which a hub portion 81 of the bearing extends. The hub 81 includes an intermediate section 82 of reduced diameter and of length slightly greater than the thickness of plate 37, and an end section 83 of diameter less than the diameter of the section 82. By these two reductions in the diameter of hub 81 shoulders 84 and 86 are provided. A nut 87 threaded on the section 83 and in clamping relationship to the shoulder 86 therefore confines the carrier member 37 between said nut and the shoulder 84.

The bearing 8 also provides support for the pickup arm 7. This is effected by means including a sleeve 88, coaxial with the axis A. Above the bearing 8, the sleeve bears a collar 89 in rigid connection with the sleeve, preferably by a set-screw 91. The collar 89 bears an arm 92, extending radially thereof, upwardly from which are bent spaced-apart ears 93. The pickup arm 7 is pivoted to the ears 93 by a pin 94 which therefore provides a horizontal axis about which the pickup arm may be rocked. The sleeve 88, on the other hand, affords a vertical pivot about which the pickup arm may be swung. It is apparent, then, that the weight of the pickup arm 7 is supported on the bearing 8, its support, if desired, being improved by a bearing washer 96 between collar 89 and said bearing.

The means to rock the pickup arm about pin 94 includes a lift rod 97, slidably journaled in the sleeve 88, and carrying at its upper end an arm 98 extending laterally thereof. The arm 7 is adapted to be spaced from arm 98 adjustably by a screw 99 threaded in arm 98, a compression spring 101 being coiled about the screw to preserve its adjustment.

Automatic means including a rubber tired friction wheel 102 and a cam 103, drivingly associated with said friction wheel, are adapted to manipulate the pickup arm and operate the ejector head 4 when a record, on the turntable 9, is rejected; that is, its reproduction discontinued in response to a manual operation or automatically as when the pickup arm reaches the conventional spiral groove, also known as the terminal groove, of a record. The construction of the cam 103, wheel 102 and their means of support will not be described in detail, since this, in part, forms the subject of a copending application, Ser. No. 776,264, filed in the name of George E. Redfield on September 27, 1947, now U. S. Pat. No. 2,636,742. It is noteworthy, however, that the cam and wheel 103 and 102 respectively, are rotatively carried by a bearing plate 104, the same being mounted on the carrier member 37 to which plate 104 is slidably anchored by means not shown. The plate 104, furthermore, carries a bearing 107 extending vertically through an opening 108 in the member 37 to provide for movement of the wheel 102 into driving communication with the turntable hub 69 when a record is rejected.

In the normal posiiton which the wheel assumes during the operation of reproducing a record, the wheel 102 is not in driven relationship to the hub 69. From this position, the wheel is swung into driving relationship with the turntable hub 69. The normal position is possible because of a break, by a notch 109, in the continuity of the periphery of said wheel. When in its normal position, wheel 102 is urged to rotate clockwise therefrom by a tension spring 111 anchored between the bracket 64 and a pin 112, extending from the cam 103 which is disposed eccentrically of the axis thereof but is restrained from rotation by interference of a stop lever 113. In greater detail, the stop lever 113 is pivoted at 114 to the carrier member 37. The stop lever 113 has a downwardly extending lug 116 adapted to be engaged by a pin 117 extending upwardly from cam 103. Interference by the stop lug 116 to motion of pin 117 is adapted to be removed by means to be described hereinafter in order that a record from the magazine may be dropped on the record just rejected.

Figure 6:
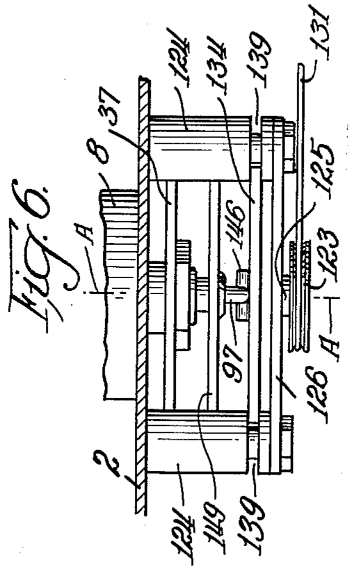
Fig. 6 is a view, partly in vertical section and partly in elevation substantially on line 6—6 of Fig. 3.
Figure 9:
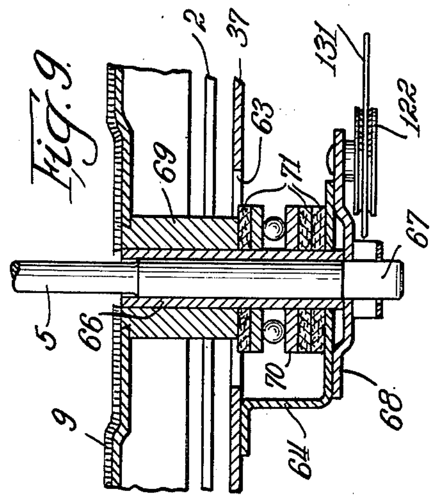
Fig. 9 is a vertical section taken on line 9—9 of Fig. 4.

As will be apparent, the position of the axis of cam 103 is variable with respect to the ejector head 4. But since a cycle of rotation of the cam is employed to operate the ejector head, regardless of the size of record that is supported thereby, it follows that some means must be employed to compensate for the variation in distance between cam and ejector head lever 27. Therefore, as one suitable compensating means I provide a cyclically operated element preferably comprising a rotatable follower 118, cooperatively associated with the cam 103, and supported at one end of a lever 119 which is pivoted at 121 to the carrier member 37. I support a sheave pulley 122 on the base of bracket 64 and a second sheave pulley 123 on the axis A by means of a pair of posts 124 (Fig. 6), on the base plate 2 which are coupled at the lower ends thereof by a bridge 126, the bridge being rigidly fastened to the posts so that a stud 125, centrally of said bridge, is adapted to provide bearing support for sheave 123. Adjacent the ejector head 4, a bell crank lever 127 (Figs. 3 and 7) is pivoted at 128 to the base plate 2 and is further linked at one end thereof to the ejector head lever 27 by a rod 130. The bell crank lever 127 is biased about its pivot 128 by a tension spring 129 anchored to the base plate and the bell crank lever. Two functions are performed by the spring 129. It maintains the push plate 19 of the ejector head in its normal or retracted position, and biases the follower 118 into constant engagement with cam 103, since lever 119 is coupled to bell crank lever 127 by a flexible cable or cord 131 passing around sheaves 122 and 123 and anchored at 132 to the bell crank lever 127 and at 133 to lever 119.

Figure 4:
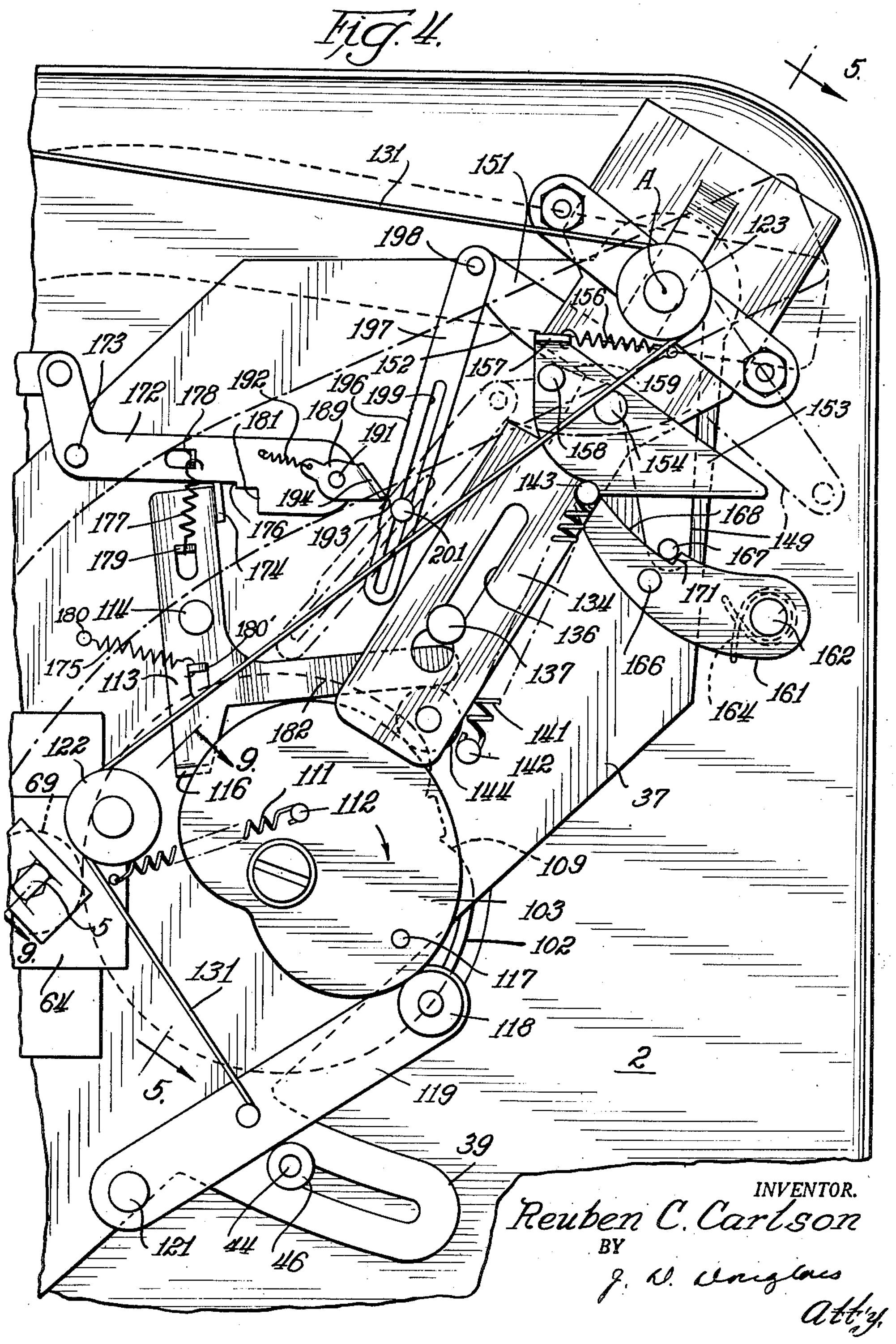
Fig. 4 is a fragmentary view, drawn to an enlarged scale, of mechanism shown in Fig. 3, different positions for the parts being indicated by dotted and dot-and-dash lines.

Mechanism including a slider 134 is adapted to communicate motion of the cam 103 to the pickup arm when a record is rejected. The slider is of elongated formation and includes a slot 136 (Figs. 4 and 5) slidably disposed about a stud 137, on base plate 2, the edges of said slot engaging an annular recess 138 in the stud to anchor the slider slidably to the base plate. At its end remote from the cam 103, the slider 134 is of increased width and the opposed edges thereof embraced by the sides of annular recesses 139 on each of the two posts 124 to provide additional bearing support for the slider. Adjacent one edge of the slider, a tension spring 141 is anchored between a pin 142, on base 2, and a pin 143 on the slider to urge it toward the cam 103. This urge is resisted by engagement of the cam by a follower 144 carried by the slider 134. It will now be understood how intermittent, rotary motion of the cam 103 is adapted to be translated into reciprocatory motion of the slider, motion thereof being in a straight line.

Means in connection with the slider is provided to rock the pickup arm about pin 94. This means involves a longitudinally extending cam portion 146 including an inclined portion 147 and a horizontal dwell portion 148 struck upwardly from the slider 134. While a record is being reproduced, the lift rod 97 rests on the slider at a point between the end thereof and the inclined portion 147. While in this position, the screw 99 is spaced slightly from the pickup arm due to the support provided therefor by the record on turntable. When, however, a record is rejected, the slider is moved, as previously described, carrying the portion 146 under the lift rod 97. In this operation the lift rod is, of course, first engaged by the inclined cam portion 147 by which the pickup arm is rocked about pin 94 to a predetermined height, from the turntable. The horizontal portion 148 then serves to support the pickup arm while other operations, later to be described, take place. As the slider is retracted by spring 141, the weight of pickup arm 7 is adequate to maintain engagement of rod 97 with the slider until the pickup arm again rests on an unplayed record on the turntable.

Movement of the slider 134 is accompanied by swinging of the pickup arm about axis A. In order that this may be effected, the pickup arm 7 is coupled to a companion arm 149 which is adapted to swing with said pickup arm because of rigid relationship between arm 149 and the sleeve 88. The companion arm 149 includes, integral therewith, a cam arm 151, extending laterally thereof, which has a curvilinear cam surface 152. The slider 134, on the other hand, bears a safety lever 153, pivotally connected at 154 to the slider, and biased about its pivotal support by a tension spring 156 anchored between a lug 157, struck downwardly from the safety lever, and the slider. The extent to which the safety lever 153 may be rotated by spring 156 is limited, however, by abutment thereof with pin 143. The spring 156 is sufficiently strong and under sufficient tension to maintain the safety lever normally in this relationship to pin 143 throughout a record changing cycle. An exception to this normal condition will be described hereinafter. Extending upwardly from the safety lever and through a notch 159 in the side of slider 134 a pin 158 is adapted to engage the cam surface 152, of arm 151, and to slide thereover as said pin is carried away from the cam 103 during a cycle of rotation thereof. Concurrent with this operation the pickup arm 7 is swung away from the axis of the turntable, after the pickup arm has, of course, first been lifted from engagement with the record it was tracking.

A positioning arm 161 is provided to swing the pickup arm toward the axis of the turntable after it has been moved away from said axis by the mechanism already described. The arm 161 is pivoted at 162 to a post 163, on the base plate 2, by which said arm is so spaced that it is adapted to swing through a horizontal plane just below the horizontal plane through which the companion arm 149 is adapted to swing. Additionally, the arm 161 is biased, clockwise, by a torsion spring 164 coiled about the post 163. During the process of reproducing a record the force of spring 164 is resisted by abutment of a pin 166, extending downwardly from arm 166, with the safety arm 153. While thus held, another pin 167, extending downwardly from the free end of companion arm 149 is adapted to be carried in a course, arcuate of the axis A, without engagement by the positioning lever 161, as when the pickup arm is tracking a record. When, however, the record is rejected and the slider 134 is consequently moved outwardly by operation of cam 103, the safety arm 153 is carried away from pin 166 thereby enabling spring 164 to swing the positioning arm 161 into engagement with pin 167 on the companion arm which is then slid over a curvilinear surface 168 on said positioning arm due to pressure of pin 158 against the cam surface 152 on cam arm 151 and consequent rotation of said cam arm about axis A due to the outward movement of the slider. As the slider 134 returns toward the axis of cam 103, due to continued rotation thereof to complete its cycle, the force of pin 158 on cam surface 152 is gradually relieved, thus enabling the surface 168 to press pin 167 in a counterclockwise direction about the axis A, due to the force of torsion spring 164. This, of course, provides for return movement of pin 167 along surface 168 in a direction toward the pivot 162 of the positioning arm. This sliding movement of pin 167 along surface 168 is arrested, however, by an abutment 171, on the positioning lever, which concurrently results in interruption of motion of the pickup arm toward the axis of the turntable from its extreme outward position, at a predetermined position just above the beginning of the sound groove of a record on the turntable 9. Immediately after the pickup arm reaches this predetermined position, the cam portion 146 moves out from under the lift rod 97, thereby enabling the pickup arm to engage the record. As the inclined portion 147 of cam 146 is moved away from lift rod 97, the safety lever 153 engages pin 166 to swing the position arm counterclockwise, thereby moving the abutment 171 free from engagement with pin 167 on the companion arm. The pickup arm is then free to track a record as it is rotated by the turntable 9.

The safety lever 153 is intended to perform another duty besides those already indicated. As previously pointed out, it ordinarily remains pressed against the pin 143, during a record changing cycle, due to the force of spring 156. During one of these operations, however, when the pickup arm is in the control of the mechanism already described, it would be possible for a person to grasp the pickup arm and forcibly swing it laterally about the axis A. When forcibly swung, in one direction arbitrarily, when the machine is in cycle, the spring 156 would then be elongated as the lever is rocked counterclockwise. If the pickup arm were swung in the opposite direction, when the machine is in cycle, the pin 167 of the companion arm would move the positioning arm counterclockwise about its pivot against the force of spring 164. In either event, movement of the pickup arm arbitrarily would not deform or fracture the record changing mechanism due to the elasticity of the springs and their ability to return the parts to their normal position.

As has been previously indicated, association of the stop lever 113 with cam 103 is adapted to provide stop mechanism to enable the pickup arm to track a record without interruption due to driving relationship between the turntable hub 69 and the wheel 102. The holding operation of the stop mechanism, however, is adapted to be released in response to movement of a trigger mechanism in turn actuated either automatically or manually. Mechanism involved for this includes a trigger lever 172 pivoted at 173 to the carrier member 37. A downwardly extending lug 174 at one end of the stop lever 113 is adapted to be swung clockwise into engagement with a shoulder 176 on lever 172 by a spring 175 anchored between a post 180 on the plate 37 and a lug 180′ on lever 113. A second spring 177 anchored between a lug 178 on the lever 172 and a lug 179 on lever 113 serves to bias the lever 172 into contact with the lug 174 on lever 113. When the shoulder 176 is engaged by lug 174, the lug 116 of the stop lever is in position to intercept pin 117 as it is carried into engagement with said lug by rotation of cam 103. When, however, trigger lever 172 is rocked counterclockwise, the lug 174 is disengaged from the holding engagement exerted thereon by shoulder 176. This enables spring 175 to swing lever 113 clockwise until lug 174 abuts another shoulder 181, while concurrently the lug 116 is swung to a point slightly remote from the course through which pin 117, on cam 103, is adapted to be carried, thereby enabling said cam to rotate through a cycle of operation.

In order that the stop lever 113 may be swung counterclockwise to return the lug 174 to holding engagement by the shoulder 176, the stop lever includes a preset arm 182 which extends laterally of said lever and is adapted to be engaged by the follower 144 on the slider 134. The arm 182 is so disposed with respect to the lug 116 that when the pickup arm is tracking a record the arm 182 is remote from the follower 144 as will be noted in Fig. 3. When, however, a record is rejected and the follower 144 moves outwardly, said follower strikes arm 182 thereby rotating stop lever 113 eventually to its extreme position indicated in Fig. 4. Then as the motion of cam 103 continues, the follower 144 is again carried toward the axis of the cam, lug 174 is again swung into holding engagement with shoulder 176 where the lug remains until trigger lever 172 is again rocked to reject a record.

Figure 3:
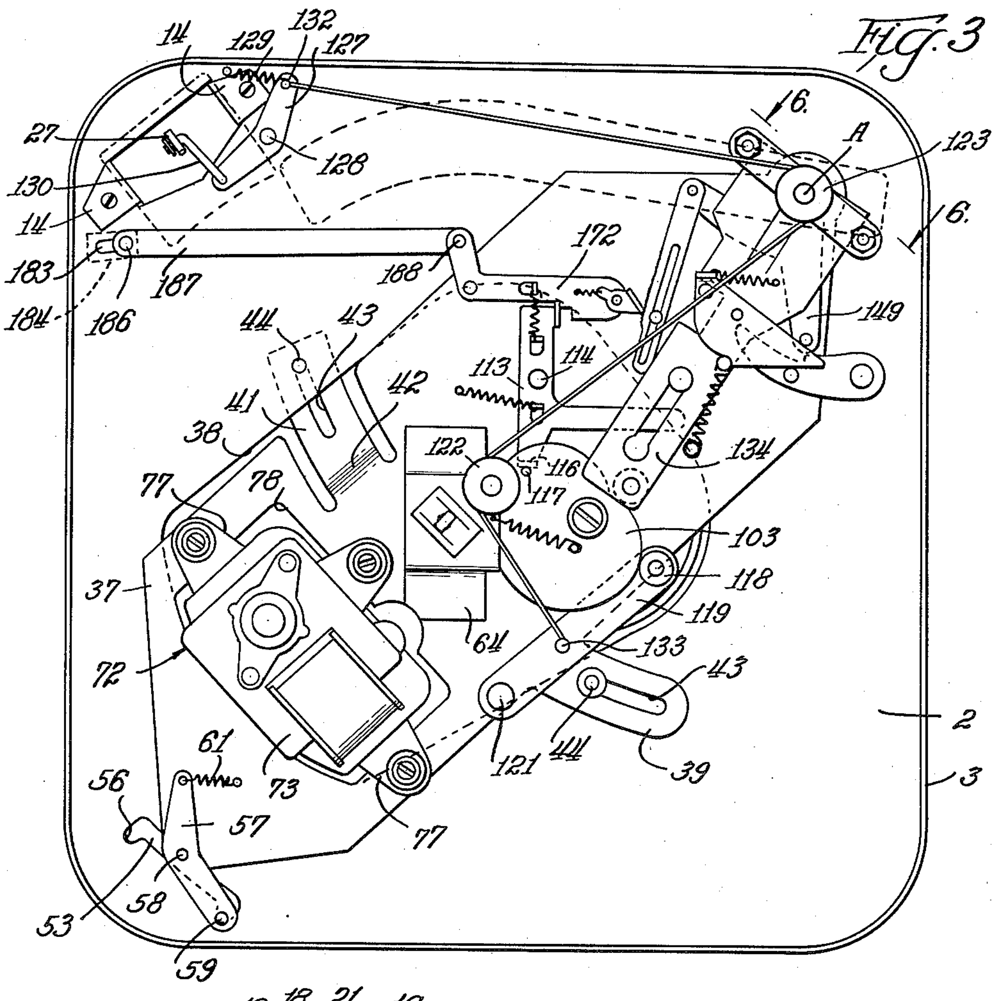
Fig. 3 is a bottom plan view of the record player shown in Fig. 1.

In order that the trigger lever may be rocked manually to reject a record at any time, a portion of the base plate 2, adjacent the ejector head, is provided with a slot 183 (Fig. 3). Above the slot is provided a handle 184 supported on a vertically disposed pin 186 in extension through slot 183. The pin 186, in turn, is carried by one end of a link 187 which is pivotally coupled at 188 to the trigger lever 172. It will now be apparent that spring 177 normally retains pin 186 at the right hand end of slot 183. On moving the pin to the opposite end of slot 183 by means of handle 184, the trigger lever 172 is rocked about its axis and the shoulder 176 consequently released from its holding action on stop lever 133 to start a record changing cycle.

In order that the trigger lever 172 may be rocked automatically, I provide a pawl 189 pivoted at 191 to said trigger lever. The pawl is biased toward a normal position by a tension spring 192, connected to one end thereof, and anchored to the trigger lever 172, while at the opposite end of the pawl a knife edge 193 is provided at one side of an ear 194 extending downwardly from the pawl. The knife edge 193 is cooperatively associated with a series of ratchet teeth 196 on the edge of a ratchet link 197 pivoted at 198 to one end of the cam arm 151. To provide additional support therefor the link 197 is provided with a slot 199, extending longitudinally thereof, slidably disposed about a headed pin 201 on the carrier member 37. The pin 201 is so positioned with respect to the knife edge 193 of the pawl that when the pickup arm is tracking a record, the ratchet teeth merely slide past the edge 193 of the pawl, since this motion of the ratchet merely turns the pawl clockwise slightly about its pivot. When, however, the pickup arm reaches the eccentric terminal groove and is swung to and from the axis of the turntable in a continuous oscillatory motion, said motion is conveyed to the link 197 which is reciprocated with respect to the pin 201. At each cycle of this motion, the knife edge of the pawl 189 is moved in a counterclockwise direction somewhat, carrying the trigger lever 172 along with it sufficiently to free lug 174, of the stop lever, from the holding action of shoulder 176. This allows the spring 111 to start a cycle of rotation of cam 103, as previously described, during which operation the ratchet link 197 is returned to its starting position being enabled to slide past the pawl 189 because of the slight counterclockwise rotation of the lever 172 caused by the return.

Having thus described my invention in an embodiment thereof, I am aware that numerous and extensive departures may be made therefrom without departing from the spirit or scope of my invention.

I claim:

1. The combination with a record player comprising a base member and magazine means including a shouldered spindle and ejector head to support a group of records in elevated position above the base member, of a carrier member to support the spindle, the ejector mechanism being supported by said base member, means to anchor said carrier member movably to said base member, said carrier member being movable to a plurality of positions wherein the distance between said spindle and said ejector mechanism is different at each position, a motive unit carried by the carrier member, a turntable also carried by said carrier member and in driving communication with said motive unit, and means driven by said turntable to communicate motion therefrom to said ejector head to release a record therefrom to said turntable.

2. An automatic record player of the class which includes a base member, a driven turntable and, in elevated position thereabove, a magazine provided by an ejector head on said base member and a shouldered spindle centrally of said turntable; in combination, means including a carrier member by which the capacity of said magazine is adapted to be varied to accommodate records differing in size, said turntable and said spindle being carried by said carrier member, a pivotal element to couple said carrier member pivotally to said base member, guide surfaces on one of said members, said surfaces being arcuate of said pivotal element, anchor studs on the other of said members adapted to cooperate with said guide surfaces to provide additional swingable support for said carrier member relative to said base member, said carrier member being movable to at least two predetermined positions, said positions being distinguished by the difference in distance between the spindle on the carrier member and said ejector head on said base member a spring biased latch in communication with said carrier member, retention surfaces on the base member adapted to be severally engaged by said latch to retain said carrier member in each of its positions, operating means on said carrier member adapted to be coupled drivingly to said turntable for operating said ejector mechanism automatically and thereby providing for transfer of a record from said magazine to said turntable in any of the predetermined positions in which it is held by said latch mechanism.

3. The combination with a record player comprising a base member which includes a substantially horizontal wall having an aperture therein, of a carrier member below the aperture, a driven turntable supported from the carrier member, magazine means including a spindle extending upwardly from said carrier member and adapted to provide support for records at their center holes, and ejector mechanism supported by said base member to provide support for the records at their peripheral edges, means including a pivotal element coupled to both of said members and adapted to provide a vertical axis about which said carrier member is adapted to be swung, thus providing for variations in the space between said spindle and said ejector mechanism to provide magazine accommodation for any one of a plurality of records differing in diameter, actuating mechanism on said carrier member adapted to be coupled to said turntable for driving communication therewith, means including a cable member to couple said actuating means to said ejector mechanism, and a deflector member on the vertical axis of said pivotal element to deflect the course of said cable thereby providing for operative communication of motion of said actuating mechanism to said ejector mechanism for release of a record from the support of said magazine to the turntable in whatever position said turntable is stationed.

4. In a record player comprising a base member and a turntable in cooperative association with which a pickup arm is adapted to be swung to a predetermined position with respect to said base member before being rocked into initial engagement with a record on the turntable, a bearing element to provide a vertical axis about which the pickup arm is adapted to be swung, a carrier member to support the turntable, said bearing element also being adapted to couple said carrier member pivotally to said base member, means in connection with both of said members by which said carrier member is adapted to be secured releasably in any one of a plurality of positions, each of said positions providing a station for a different size of record on said turntable, each of the records when in said stations having its sound groove at the predetermined position to which said pickup arm is adapted to be swung, means to manipulate said pickup arm including motive means supported from said carrier member to drive said turntable, a rotary element supported from the carrier member, means in connection with one of said members adapted to provide for cyclical driving relationship between the turntable and said rotary element, movable stop means in connection with one of said members by which said cyclical driving relationship is adapted to be delayed during reproduction of a record on the turntable, manually operated trigger means supported by said base member and cooperatively associated with said movable stop means, ratchet mechanism coupled to said pickup arm, a pawl in connection with said trigger means and adapted to be operated by movement of said ratchet means when said pickup arm is moved in one direction by the terminal groove of a record on the turntable, said movable stop member being thereby adapted to be moved in response to movement of said manually operated trigger means or automatically by the terminal groove of a record, means including a reciprocatory element carried by said carrier member to convey motion of said rotary element to the pickup arm to swing said pickup arm out of engagement with and away from a record on the turntable, and means including a positioning element supported from one of said members to swing said pickup arm to the predetermined position therefor from whence the pickup arm is rocked into initial engagement with one of the records on the turntable.

5. In a record player comprising a base member and a turntable in cooperative association with which a pickup arm is adapted to be swung automatically to a predetermined position with respect to said base member before being rocked into initial engagement with a record on the turntable, means including a carrier member to support the turntable, a bearing element to couple said carrier member pivotally to said base member and to space the pickup arm from said base member, said bearing member providing a vertical axis about which said pickup arm and said carrier member are adapted to be swung, means in connection with both of said members by which said carrier member is adapted to be secured releasably in any one of a plurality of positions to provide a plurality of positions for the turntable, each of said positions providing a station for a different size of record wherein the beginning of the sound groove of each of the respective records is adapted to be stationed at the predetermined position to which said pickup arm is adapted to be swung, magazine means to provide support for a group of similar sized records above the level of said turntable, said magazine means including an ejector mechanism including a push plate supported by said base member to provide support for the records at their peripheral edges, means supported from said carrier member by which the magazine is adapted to be adjusted concurrently with movement of the turntable to one of said predetermined stations, said last named means being adapted to provide support for the records at their center holes and which is adapted to accommodate in the magazine only the size of record that is supported for operative reproduction by the turntable in whichever of the plurality of stations said turntable is shifted, means for operating the push plate to release one of any sized record from said magazine means to said turntable including motive means supported from said carrier member to drive said turntable, a rotary element supported from the carrier member, means in connection with one of said members adapted to provide for cyclical driving relationship between the turntable and said rotary element, movable stop means in connection with one of said members by which said cyclical driving relationship is adapted to be delayed during reproduction of a record on the turntable, manually operated trigger means supported by said base member and cooperatively associated with said movable stop means, ratchet mechanism coupled to said pickup arm, a pawl in connection with said trigger means and adapted to be operated by movement of said ratchet means when said pickup arm is moved in one direction by the terminal groove of a record on the turntable, said movable stop member being thereby adapted to be moved in response to movement of said manually operated trigger means or automatically by the terminal groove of a record, means including a swingable element supported from said carrier member and cooperatively associated with said rotary element, a flexible connector element to communicate motion of said swingable element to said push plate, and means including a pulley on the axis of said bearing member to determine the course extended through by said flexible element to provide for operative communication of motion of said swingable element to said push plate regardless of the station into which said turntable is carried by said carrier member, operation of said push plate being adapted to provide for transfer of a record of any of the sizes from the magazine means to said turntable.

6. In an automatic record player comprising a base member and a turntable with which is associated a pickup arm to engage records on the turntable, means including a carrier member to provide support for the turntable, means including a bearing member by which the carrier member is adapted to be coupled pivotally to the base member, said turntable being thereby adapted to be swung about a vertical axis to any one of a plurality of predetermined positions, a record of a different diameter being accommodated by the turntable in each of said positions wherein the beginning of the sound grooves of each of the records is positioned at a predetermined point with respect to said base member, means including a slider element by which said pickup arm is adapted to be manipulated automatically with respect to said starting point, anchor means on said carrier member to associate said slider element slidably with said carrier member, anchor means in connection with said base member to adjust said carrier member rotatably about said vertical axis, resilient means coupled to one of said members and by which said slider element is adapted to be biased in a predetermined direction, an automatic cyclically operative element adapted to urge said slider element against the biasing action of said resilient means, a lift cam on said slider element, means including a lift rod at said vertical axis by which motion of said lift cam is adapted to be communicated to the pickup arm for rocking said arm out of engagement with a record when said record has been rejected, a companion arm, means in connection with both of said members to couple said pickup arm rigidly to said companion arm, a safety mechanism coupled to said slider element, said safety mechanism including a yieldably supported element adapted to cooperate with said companion arm when said pickup arm has been rocked upwardly by said lift cam to swing the pickup arm outwardly, a spring biased positioning element supported from the base member, said positioning element being adapted to be swung by said companion arm when said pickup arm is moved outwardly, said positioning element being then adapted to swing said pickup arm inwardly as said slider element is moved in said predetermined direction by said resilient element, a stop surface in connection with said positioning element, said surface being adapted to cooperate with said companion arm to limit inward swing of said pickup arm to a point over said predetermined starting point, said safety mechanism being adapted to remove said positioning element from engagement with said companion arm as said lift cam is moved out of engagement with said lift rod thereby providing for downward rocking of said pickup arm into engagement with the beginning of the sound grooves of any one of the records at said predetermined position.

7. A record player comprising, in combination, a base plate, a pickup arm movably mounted on said base plate adapted to be swung automatically to a fixed let-down position, an ejector operating means and an injector head and a driving means, said ejector operating means engaging said driving means and connected to said ejector head to operate said head to eject a record, a carrier member movably mounted on said base plate, a turntable rotatably mounted on said carrier member, positioning means on said base member connected to said pickup arm to determine said let-down position, said carrier member being movable between a plurality of positions, said positions being distinguished by the difference in distance between said let down position and the center of said turntable, operating means for said pickup arm including driving means journalled on said carrier member and engageable with said turntable in driven relation thereto, trigger means on said carrier member engaging said driving means adapted to initiate said driven relation, reciprocable pickup arm manipulating means slidably mounted on said carrier member and connected between said driving means and said pickup arm to swing said arm when said trigger means initiates the engagement of said driving means with said turntable.

References Cited in the file of this patent

UNITED STATES PATENTS

| Number | Name | Date |
|---|---|---|
| 1,991,005 | Whitman | Feb. 12, 1935 |
| 2,331,383 | Faulkner | Oct. 12, 1943 |
| 2,396 094 | Gay | Mar. 5, 1946 |